Feb. 9, 1965 TADASHI KIKUCHI 3,169,195

MAGNETIC DELAY CIRCUITS FOR COMPUTER SYSTEMS

Filed Dec. 27, 1960

INVENTOR.
T. Kikuchi

BY

Greene, Pineles & Durr

ATTORNEYS

United States Patent Office 3,169,195
Patented Feb. 9, 1965

3,169,195
MAGNETIC DELAY CIRCUITS FOR COMPUTER SYSTEMS

Tadashi Kikuchi, Sendai-shi, Japan, assignor to Tohoku Metal Industries, Ltd., Sendai, Japan, a corporation of Japan Filed Dec. 27, 1960, Ser. No. 78,575
Claims priority, application Japan, Dec. 28, 1959, 34/40,867
6 Claims. (Cl. 307—88)

This invention relates to novel magnetic delay circuits for computer systems. The invention hereof is particularly directed to improved magnetic delay core-transistor computer circuit logic units requiring substantally reduced drive power. With the magnetic units of this invention, a large number of them may be driven by a compact power source. The novel circuits hereof utilize a transistor in both the input or set and the drive core windings. Relatively small standby or operating energy is consumed, and efficient and effective magnetic bit storage and read-out are effectuated. The invention circuit logic units are particularly useful in shifting circuits, as in shift registers.

The primary object of the present invention is to provide novel magnetic delay circuitry for computer systems. Another object of the present invention is to provide novel magnetic core-transistor computer circuit logic units. A further object of the present invention is to provide novel magnetic delay units for shift register circuits.

The foregoing and other objects of the invention will be best understood from the following description of exemplifications thereof, reference being had to the accompanying drawing, wherein.

The conventional dot code for the winding polarity is used in the figures, namely that the polarity of the voltage induced in any winding is the same as the polarity of the voltage applied to the winding which is causing the polarities to be common at the dots of the respective windings.

Figures 1, 3:
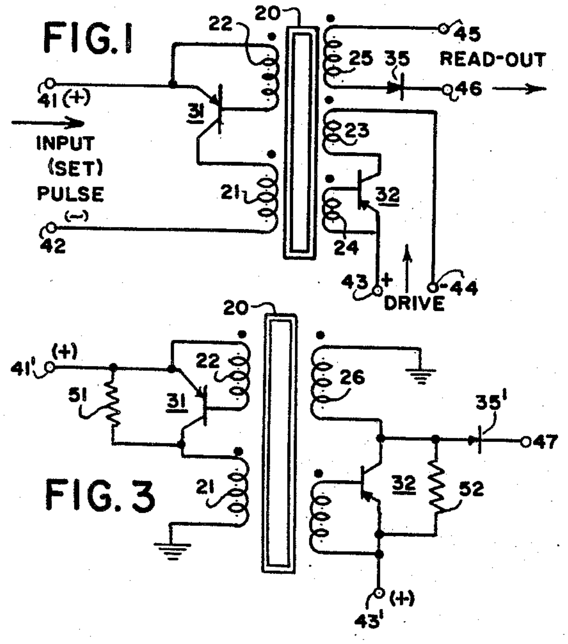
FIG. 1 is a circuit diagram of the exemplary embodiment of the invention.
FIG. 3 is a circuit diagram of a modified form of the invention.
Figure 2:
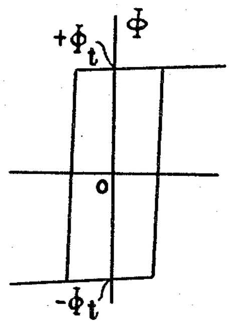
FIG. 2 is the rectangular hysteresis curve of the magnetic core.

Referring to FIG. 1, the magnetic core 20 may be toroidal in form. It has the rectangular hystersis characteristics shown in FIG. 2 and well known in the art. Windings 21, 22, 23, 24 and 25 are wound respectively on magnetic core 20, in the usual manner.

Winding 21 is the set or input circuit, with transistor 31. Winding 25 is the read-out set or circuit, with diode rectifier 35 in series. Winding 22 is connected across the base-emitter of the transistor 31 in the input circuit. The resistance at the emitter-collector of transistor 31 is reduced by the E.M.F. induced when the magnetic flux of the magnetic core 20 is changed from the positive, saturated value ($+\phi t$) to the negative saturated value ($-\phi t$). The resistance at the emitter-collector of transistor 31 is increased when the magnetic flux $\phi$ is changed from the negative saturated value to the positive saturated value. Winding 24 is connected across the base-emitter of transistor 32 in the driving circuit. The resistance of the emitter-collector of transistor 32 is decreased when the magnetic flux of core 20 is changed from the negative saturated value ($-\phi t$) to the postive saturated value ($+\phi t$), and is increased when said magnetic flux is changed from the positive saturated value to the negative saturated value.

The operation of the input circuit will now be explained. When a pulse of the polarity shown in FIG. 1 is supplied to the input terminals 41 and 42 to cause a magnetic flux change of the core 20 from the positive saturated value to the negative value, a small current at first will flow through the winding 21. Then the current will flow through the winding 22, and through the emitter-base of transistor 31 by the resultant magnetic flux change. Consequently, a rapid decrease of the resistance in the transistor 31 emitter-collector circuit results. The major part of input pulse thus occurs across winding 21. If the input pulse is large enough, the magnetic flux of core 20 changes rapidly from the positive saturated value to the negative saturated value, for the indicated pulse polarity. This input action of flux reversal is often termed "set."

After the reversal of the magnetization of the core 20, the magnetic flux will not change further, and the E.M.F. in winding 22 will disappear. Thus the resistance in transistor 31 thereupon increases, and then the current in the input circuit 41, 42 will be a small value again. In other words, the necessary input power is sufficient only to cause the flux change from the positive saturated value to the negative value, and the input circuit thereupon becomes quiescent.

During this reversal (set) of the core magnetization, the E.M.F. induced in the read-out winding 25 does not appear at its output terminals 45, 46, because of the interruption of such pulse directions by diode rectifier 35. At the same time, in the driving circuit 43, 44, the E.M.F. induced in winding 24 is applied across the emitter-base of transistor 32 in the opposite direction to the drive pulse polarity as indicated in the figure. The resistance in transistor 32 will thereupon be increased, and the resistance of the driving circuit 43, 44 will be greatly increased. Thus the invention driving circuit 43, 44 cannot cause reversal of operation or error in core magnetization by the input pulse at 41, 42, nor cause it to be interrupted in function.

The operation of the driving circuit will now be explained. At the driving circuit terminals 43, 44, a drive pulse, e.g., as a rectangular wave signal having the polarity shown in FIG. 1, is supplied. In this specification, such pulse is termed the "driving voltage." When the core 20 is magnetized at the positive saturated flux value ($+\phi t$) before the application of the driving voltage, the resistance in transistor 32 will not be decreased. Little current will thereupon flow in the driving circuit because the magnetic flux of the core 20 cannot be further changed thereby. However, when the core has been magnetized to the negative saturated value ($-\phi t$) before the application of the driving voltage pulse, at first a small current will flow through winding 23. Then E.M.F. will be induced in winding 24 by the positive flux change, so that the resistance in transistor 32 becomes decreased, and the major part of the driving voltage will appear across winding 23 until finally the core magnetization will be fully reversed to the positive saturated value.

After such reversal of the core magnetization, the E.M.F. in winding 24 disappears, and the resistance in the transistor 32 circuit will be increased, and then the current through this circuit will again be decreased. At this time, the E.M.F. induced in the output or read-out winding 25 can be taken out through the diode 35 at the output terminals 45, 46. Concurrently, the magnetic flux of core 20 will change from the negative saturated value to the positive saturated value. Further, by the E.M.F. induced in winding 22, the resistance in the transistor 31 will be increased, so that the driving operation is not affected by the nature of input circuit 21, 31. Therefore, in the core-transistor circuit of the invention shown in FIG. 1, when the registration and/or reading-out of information occurs through the respective input pulse and/or driving voltage, there is not encountered mutual effects between the input-driving circuits and the input-output circuits, that are deleterious or erratic. Furthermore, the power required for the input and the driving circuits is sufficient only to reverse the core 20 magnetization, so that only moderate power is needed. Therefore, power requirements of the circuit of the invention are lower than that of other known magnetic delay circuit elements.

A modified circuit is illustrated in FIG. 3, wherein adjustment of the exciting current required at the starting time of the core magnetization reversal, is arranged through shunt resistances 51 and 52 respectively connected across transistors 31 and 32. Simplification of the circuit is possible by using one winding 26 to serve as both the output (corresponding to 25) and the driving winding corresponding to 23 in FIG. 1. The diode 35′ connects between windings 24 and 26, and a single output or read-out terminal 47. A single (+) drive terminal 43′ and a single (+) input or registration (set) pulse terminal 41′, are used.

Figure 4:
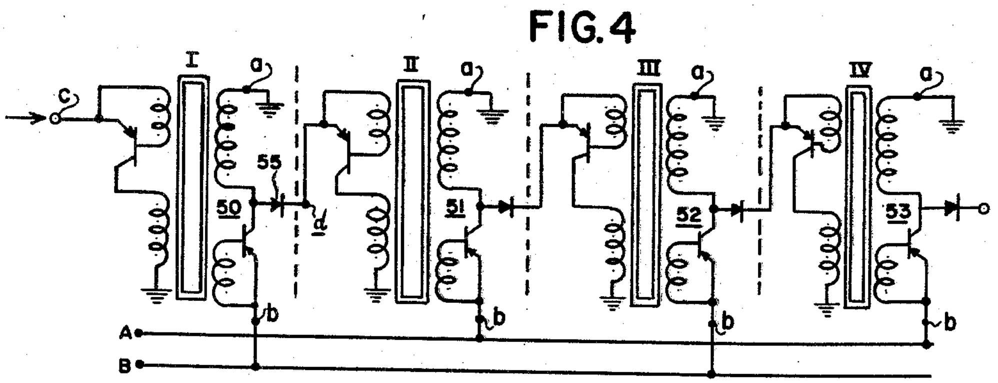
FIGS. 4 and 5 show computer shift circuits with the magnetic delay elements of FIGS. 1 and 3.

FIG. 4 illustrates an embodiment of a shift register using the FIG. 3 circuit elements of the present invention. One terminal *a* of the driving circuits 50, 51, 52, 53, is grounded at each stage I, II, etc., and the other terminal *b* of the driving circuits is connected to alternate control system lines A and B, at which the half-wave voltages, as pulses, are supplied periodically. In the FIG. 4 shift register, each driving circuit is thus connected in parallel across power source A, B, and it is not necessary to choose a power source having a high internal impedance. This embodiment is therefore preferable to known registers in which each driving winding is connected in series to the power source that is required to be of high impedance.

In operation, the original input set pulse is impressed on terminal *c*. The drive pulse from line B to driving circuit 50 of the first section I, creates a read-out or output pulse through diode 55, that becomes the input or set pulse into terminal *d* of the next successive section II. In this way, the signal lines A, B can shift preceding pulses to the next successive section, in the manner well known for shift registers.

Figure 5:
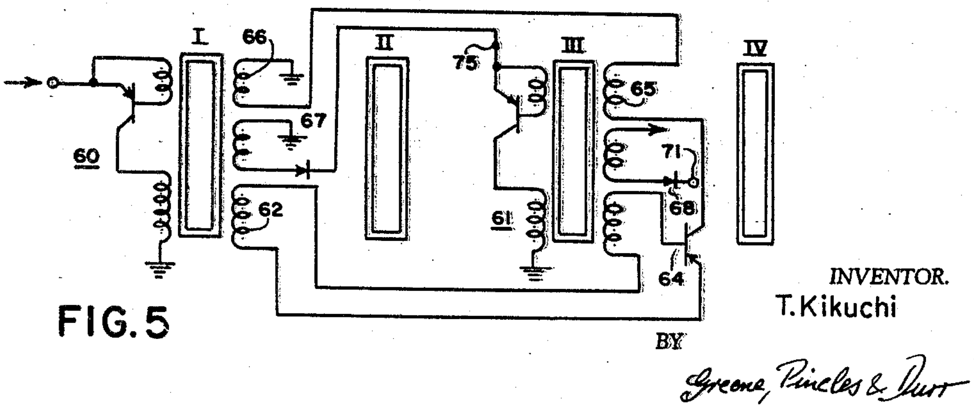

FIG. 5 is a circuit diagram of a modified shift register utilizing principles of the present invention making for simplicity and economy. Alternate units I, III (and II, IV) have their driving windings connected in series. The circuits for sections II and IV are not shown, but are understood to be the same as for sections I and III. The input circuits 60, 61 are the same as for FIGS. 1 and 4.

The driving circuits each contain three windings, as in FIG. 1, but save one transistor through their illustrated interconnection: Coil 62 of section I connects across coil 63 of section III through a transistor 64. The collector of transistor 64 connects to winding 65 of section III in series with a corresponding one 66 of section I. The read-out or output pulse from diode 67 of section I is impressed on the input terminal 70 of section III. The latter's output diode 68 has an output terminal 71 for further utilization.

It will be apparent to those skilled in the art that the novel principles of the invention disclosed herein in connection with specific exemplifications thereof, will suggest other modifications and applications of the same. It is accordingly desired that in construing the breadth of the appended claims, they shall not be limited to the specific exemplifications of the invention described herein.

I claim:

1. A computer magnetic delay circuit comprising a core of magnetic material having a high remanence characteristic relative to saturation, an input set and a drive-output set of windings on said core, a first transistor in circuit with said input winding set for building up an input pulse applied thereto to establish a first predetermined saturated level of magnetization in said core, a second transistor in circuit with said drive-output winding set for building up a drive-pulse applied thereto to produce a second predetermined saturated level of magnetization in said core reversed to that established by said input pulse, and an output circuit associated with said drive-output winding set when the said drive-output circuit produces said core magnetization reversal in response to a drive pulse, a second input set winding on said core connected to said first transistor, said input set windings being connected to said first transistor and said core to drive said first transistor into cutoff when said core achieves said first predetermined state of saturation.

2. A computer magnetic delay circuit comprising a core of magnetic material having a high remanence characteristic relative to saturation, an input set and a drive-output set of windings on said core, a first transistor in circuit with said input winding set for building up an input pulse applied thereto to establish a first predetermined saturated level of magnetization in said core, a second transistor in circuit with said drive-output winding set for building up a drive pulse applied thereto to produce a second predetermined saturated level of magnetization in said core reversed to that established by said input pulse, and an output circuit associated with said drive-output winding set including a diode connected therewith to provide an output pulse when the said drive-output circuit produces said core magnetization reversal in response to a drive pulse, a second input set winding on said core connected to said first transistor, said input set windings being connected to said first transistor and said core to drive said first transistor into cutoff when said core achieves said first predetermined state of saturation.

3. A computer magnetic delay circuit comprising a core of magnetic material having a high remanence characteristic relative to saturation, an input set and a drive-output set of windings on said core, a first transistor in circuit with said input winding set for building up an input pulse applied thereto to establish a first predetermined saturated level of magnetization in said core including a first winding connected across the base-emitter of said first transistor and a second winding in series with the emitter-collector thereof, a second transistor in circuit with said drive-output winding set for building up a drive pulse applied thereto to produce a second predetermined saturated level of magnetization in said core reversed to that established by said input pulse, and an output circuit associated with said drive-ouput winding set to provide an output pulse when the said drive-output circuit produces said core magnetization reversal in response to a drive pulse and zero output when an input pulse is applied to the said input circuit, said first and second input windings being connected to drive said first transistor into cutoff when said core is driven to said first predetermined saturation level.

4. A computer magnetic delay circuit comprising a core of magnetic material having a high remanence characteristic relative to saturation, an input set and a drive-output set of windings on said core, a first transistor in circuit with said input winding set for building up an input pulse applied thereto to establish a predetermined saturated level of magnetization in said core including a first winding connected across the base-emitter of said first transistor and a second winding in series with the emitter collector thereof, and a second transistor in circuit with said drive-output winding set for building up a drive pulse applied thereto to produce a predetermined saturated level of magnetization in said core reversed to that established by said input pulse, including a third winding connected across the base-emitter of said second transistor and a fourth winding in series with the emitter-collector thereof, and an output circuit associated with said drive-output winding set including a diode connected therewith to provide an output pulse when the said drive-output circuit produces said core magnetization reversal in response to a drive pulse, said first and second input windings being connected to drive said first transistor into cutoff when said core is driven to said first predetermined saturation level; said third and fourth output windings being connected to drive said second transistor into cutoff when said core is driven into said second predetermined saturation level.

5. A computer magnetic delay circuit comprising a core of magnetic material having a high remanence characteristic relative to saturation, an input set and a drive-output set of windings on said core, a first transistor in circuit with said input winding set for building up an input pulse applied thereto to establish a predetermined saturated level of magnetization in said core including a first winding connected across the base-emitter of said first transistor and a second winding in series with the emitter-collector thereof, a second transistor in circuit with said drive-output winding set for building up a drive pulse applied thereto to a predetermined saturated level of magnetization in said core reversed to that established by said input pulse including a third winding connected across the base-emitter of said second transistor and a fourth winding in series with the emitter-collector thereof, and an output circuit associated with said drive-output winding set including an output winding and a diode connected therewith to provide an output pulse when the said drive-output circuit produces said core magnetization reversal in response to a drive pulse, and zero output when an input pulse is applied to the said input circuit; said first and second input windings being connected to drive said first transistor into cutoff when said core is driven to said first predetermined saturation level; said third and fourth output windings being connected to drive said second transistor into cutoff when said core is driven into said second predetermined saturation level; said first and second input windings being further adapted to prevent conduction of said first transistor when said core is being driven into said second predetermined level of saturation.

6. A computer magnetic delay circuit comprising a core of magnetic material having a high remanence characteristic relative to saturation, an input set and a drive-output set of windings on said core, a first transistor in circuit with said input winding set for building up an input pulse applied thereto to establish a predetermined saturated level of magnetization in said core including a first winding connected across the base-emitter of said first transistor and a second winding in series with the emitter-collector thereof, a second transistor in circuit with said drive-output winding set for building up a drive pulse applied thereto to a predetermined saturated level of magnetization in said core reversed to that established by said input pulse including a third winding connected across the base-emitter of said second transistor and a fourth winding in series with the emitter-collector thereof, and an output circuit associated with said drive-output winding set including an output winding and a diode connected therewith to provide an output pulse when the said drive-output circuit produces said core magnetization reversal in response to a drive pulse, and zero output when an input pulse is applied to the said input circuit, said first and second input windings being connected to drive said first transistor into cutoff when said core is driven to said first predetermined saturation level; said third and fourth output windings being connected to drive said second transistor into cutoff when said core is driven into said second predetermined saturation level; said first and second input windings being further adapted to prevent conduction of said first transistor when said core is being driven into said second predetermined level of saturation, said third and fourth input windings being further adapted to prevent conduction of said second transistor when said core is being driven into said first predetermined level of saturation.

References Cited by the Examiner

UNITED STATES PATENTS

| | | | |
|---|---|---|---|
| 2,866,178 | 12/58 | Lo et al. | 307—88 X |
| 2,909,674 | 10/59 | Moore et al. | 307—88 |
| 2,953,741 | 9/60 | Pittman et al. | 307—88 X |
| 2,955,211 | 10/60 | Ostroff | 307—88 |
| 3,003,141 | 10/61 | Meyers | 307—88 X |

IRVING L. SRAGOW, *Primary Examiner.*

JOHN T. BURNS, *Examiner.*